United States Patent [19]

Matthews et al.

[11] 4,143,029

[45] Mar. 6, 1979

[54] FLAME RETARDED POLYURETHANE COMPOSITIONS

[75] Inventors: Demetreos N. Matthews, Bethany; Walter Nudenberg, Newton, both of Conn.

[73] Assignee: Uniroyal, Inc., New York, N.Y.

[21] Appl. No.: 796,580

[22] Filed: May 13, 1977

[51] Int. Cl.² .................................................. C08K 5/34
[52] U.S. Cl. ........................ 260/45.8 NT; 260/45.8 N; 521/115; 521/128
[58] Field of Search .................. 260/2.5 AJ, 45.8 NT, 260/45.8 N

[56] References Cited

U.S. PATENT DOCUMENTS

| | | | |
|---|---|---|---|
| 3,211,676 | 10/1965 | Spencer | 260/45.8 NT |
| 3,651,003 | 3/1972 | Bechtold | 260/45.8 NT |
| 3,897,372 | 7/1975 | Kehr et al. | 260/2.5 AJ |
| 4,039,538 | 8/1977 | Klinkenberg et al. | 260/45.8 NT |

*Primary Examiner*—V. P. Hoke
*Attorney, Agent, or Firm*—Anthony Lagani, Jr.

[57] ABSTRACT

A dripless, fire-retarded, polyurethane elastomer comprising a blend of the elastomer with a hexaalkoxymethylmelamine, a trihydrocarbylcarbonylmelamine and compounds selected from the group comprising (1) aromatic bismaleimide or (2) an aromatic bismaleimide generator.

12 Claims, No Drawings

FLAME RETARDED POLYURETHANE COMPOSITIONS

BACKGROUND OF THE INVENTION

Polyurethanes which are flame-retardant are highly desired and required for many applications especially as the pressure for flame-retarded products increases in the legislative area. In general, imparting a specified level of flame-retardancy to polyurethane polymers can be accomplished with relative ease by compounding with flame-retardant compounds after the polycondensation reaction leading to the formation of the polymer. Flame-retardants, classified by function, fall logically into three major classes: reactive, additive and synergistic.

The most widely used flame-retardants for polyurethanes are the additive type such as the halogenated aliphatic hydrocarbons in conjunction with synergists such as antimony compounds; see, for example, Modern Plastics Encyclopedia, p. 228, 1974–1975. The synergist enhances the effectiveness of the flame-retardant and thereby provides higher levels of flame-retardance at moderate flame-retardant use levels without significantly compromising other desirable physical properties; see Lyons, J.W., "The Chemistry & Uses of Fire-Retardants," p. 364, 1970; John Wiley & Sons, Inc.

Flexible polyurethanes, both solid and foamed, are more difficult to flame-retard while maintaining an acceptable balance of properties. The flexible polyurethane molecules are longer and more delicate than the rigid molecules and are therefore more sensitive to the loss of key physical properties with minor changes in composition. The flexible molecules are also more flammable than the molecules of rigid polyurethanes because they contain a higher percentage of flammable components such as aliphatic polyethers, 70% versus 50% or less for the rigid polyurethanes. An additional drawback of flame-retardant flexible polyurethanes is the phenomenon of dripping of the melted polyurethane polymer while it is burning during and shortly after ignition. The flaming droplets may spread the flame beyond the site of initial ignition. Indeed, in some compositions, the formulation would be self-extinguishing except for the fact that the dripping away of the melted polymer constantly exposes a fresh new surface of polymer to the fire, and the fire continues to progress.

SUMMARY OF THE INVENTION

It has surprisingly been found that a dripless, fire-retarded, polyurethane elastomer may be prepared by blending the elastomer with hexaalkoxymethylmelamine, a trihydrocarbylcarbonylmelamine and compounds selected from the group comprising (1) aromatic bismaleimide or (2) an aromatic bismaleimide generator.

DETAILED DESCRIPTION

This invention relates to fire retarded polyurethane elastomers. In particular this invention relates to polyurethane elastomers which are rendered fire retardant and dripless at combustion conditions by the addition of hexaalkoxymethylmelamine and trihydrocarbylcarbonylmelamine. Synergists which may be incorporated into the compositions of this invention include aromatic bismaleimides and aromatic bismaleimide generators. The hexaalkoxymethylmelamine useful in the practice of this invention have the general formula:

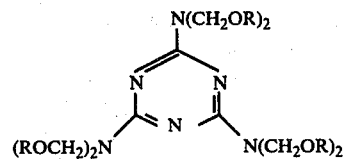

wherein R is a $C_1 - C_5$ straight or branched chain alkyl group.

Illustrative non-limiting examples of the substituted melamines which are operative in this invention are hexamethoxymethylmelamine, hexaethoxymethylmelamine, hexapropoxymethylmelamine, hexabutoxymethylmelamine, hexaisobutoxymethylmelamine and hexapentoxymethylmelamine.

The trihydrocarbylcarbonylmelamines which are operative in this invention have the general formula:

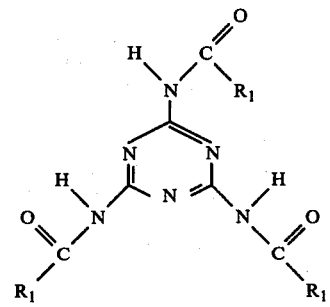

Wherein $R_1$ is a $C_1 - C_5$ straight or branched chain alkyl group or a phenyl group, $R_1$ may be substituted with a cyano group. Alternately the phenyl group may be substituted with one or two methyl groups.

Illustrative, non-limiting examples of the trihydrocarboylcarbonylmelamines which are operative in this invention are triacetylmelamine, tripropionylmelamine, tributanoylmelamine, tripentanoylmelamine, tribenzoylmelamine, tri-(p-methylbenzoyl)melamine, tri-(2,4-dimethylbenzoyl)melamine and tricyanoacetylmelamine.

The aromatic bismaleimide compounds which are operative in this invention are p-phenylene-bismaleimide itself and those aromatic bismaleimide generators having the formula:

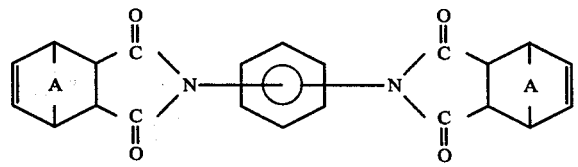

where A is either —$CH_2$— or —O— provided, however, that when the nitrogen atoms are in the meta configuration, A may not be —O—.

These compounds are the Diels-Alder adducts of two moles of a furan or cyclopentadiene with one mole of an aromatic bismaleimide.

Illustrative, non-limiting examples of the above bismaleimide generators are:

N,N'-m-phenylene-bis(3,6-methano-1,2,3,6-tetrahydrophthalimide), (MPMT),
N,N'-p-phenylene-bis(3,6-methano-1,2,3,6-tetrahydrophthalimide); (PPMT) and N,N'-p-phenylene-bis(3,6-oxa-1,2,3,6-tetrahydrophthalimide); (PPOT) and the like.

The term "bismaleimide generator" as used in the specification and claims means compounds which generate as a result of molecular scission the particular phenylene-bismaleimide from which they were made at temperatures above the contemplated processing temperatures and below or at the usual decomposition temperatures of polyurethane.

The preformed thermoplastic polyurethane elastomers or elastoplastics which are operative in this invention are conventional materials (see, for example "Polyurethane Technology," by Bruins, Interscience Publishers, pages 198-200; also "Modern Plastics Encyclopedia," 1968, page 289). Examples are such polyether based polyurethanes as those made from 2 moles of polytetramethylene ether glycol or polyester glycol, 3 moles of MDI and 1 mole of 1,4-butane diol and polyester based polyurethanes such as are similarly derived from 1,4-butane diol-adipic acid polyester and MDI (Rubber Chemistry and Technology, Vol. 35, 1962, page 742, Schollenberger et al). Commercially available materials of this category include Estane (trademark), Texin (trademark) 480-A, Roylar (trademark) E-85N, and Cyanaprene (trademark).

Many such products may be described as reaction products of a polymeric polyol (e.g., a polyester glycol or a polyether glycol) with an organic polyisocyanate (whether aromatic, aliphatic or cycloaliphatic), usually a diisocyanate, frequently along with a low molecular weight bifunctional material having two reactive hydrogens, such as a glycol or diamine (see also U.S. Pat. No. 3,462,326, Steele et al., Aug. 19, 1969, especially col. 3, lines 1 to 35; also U.S. Pat. No. 3,678,129, Fischer, July 18, 1972, col. 8, line 65 to col. 2, line 9 and col. 3, lines 19-30). Thermoplastic polyurethane elastomers are high molecular weight materials devoid of olefinic unsaturation; they do not contain available —NCO groups.

There are several embodiments of the invention described in this specification, each embodiment constitutes an additive system which will produce a self-extinguishing, non-dripping polyurethane elastoplastic composition. Other embodiments will be evident to one skilled in this art having studied this disclosure.

The following samples, in which all quantities are expressed by weight unless otherwise indicated, will serve to illustrate the several embodiments of this invention in more detail.

The following embodiment shows the effectiveness of the hexaalkoxymethylmelamine, trihydrocarbylcarbonylmelamine system in producing a self-extinguishing, non-dripping polyurethane elastoplastic.

EXAMPLE I

Triacetyl melamine and hexaalkoxymethylmelamine were blended into a polyurethane polymer by putting a quantity of the raw polymer on a conventional two-roll rubber mill heated to 350° F. and adding the additives one at a time, followed by a mixing period of at least three minutes. The mixture was then placed into a 6" × 8" × ⅛" picture frame mold, compression molded for five minutes at 350° F. and a molding pressure of 1000 psi, and then cooled while maintaining the molding pressure. Test samples were fashioned from the compression molded slabs and flammability testing was carried as follows in "as prepared" condition:

1. Oxygen Index: ASTM Method D-2863, "Flammability of Plastics Using the Oxygen Index Method." Oxygen index is the minimum concentration of oxygen, expressed as percent by volume, in a slowly rising mixture of nitrogen and oxygen, that will just support the combustion of a material burning under equilibrium conditions of candle-like burning. Higher "Oxygen Index" indicates decreased relative flammability. In addition, since the method provides a continuous numerical scale for the assignment of relative flammability ratings, it is especially appropriate for illustrating differences in the degree of flame retardating provided by additives. Test sample size was 3" × ¼" × ⅛".

2. Vertical Burning Test: performance was determined in substantial accordance with Underwriters Laboratories Subject 94 Vertical (UL-94 V (⅛")) Burning Test for Classifying Materials 94-V-0. Five test samples, 5" × 12" × ⅛", were used for each formulation subjected to ignition by a preset flame for 10 seconds, waiting until the flame goes out, reignition for 10 seconds and recording the burning time in seconds. For a VE-0 rating, no specimen may have a burning time of more than 10 seconds for each application of the flame, and there cannot be a total flaming combustion time exceeding 50 seconds for the 10 flame applications for each set of 5 test specimens.

The results of the effectiveness of the hexaalkoxymethylmelamine, trihydrocarbylcarbonylmelamine system in polyurethane elastoplastics are set forth in Table I below.

TABLE I

| FORMULATION | A | B | C | D | E | F | G | H |
|---|---|---|---|---|---|---|---|---|
| Roylar E85N[1] | 100 | 100 | 100 | — | 100 | 100 | — | — |
| Texin 3550[2] | — | — | — | 100 | — | — | 100 | 100 |
| Cymel 300[3] | 25 | — | — | — | 10 | — | 10 | — |
| Cymel 301[4] | — | 25 | — | — | — | 10 | — | 10 |
| Triacetylmelamine[5] | — | — | 25 | 25 | 25 | 25 | 25 | 25 |
| Flammability | | | | | | | | |
| Oxygen Index | 21.6 | 21 | 24.8 | 25.7 | 26.7 | 29.6 | — | — |
| UL-94V (⅛") | burns; no drip | burns; no drip | VE-0 drip | burns; drip | burns; drip | burns; no drip | VE-0 no drip | VE-0 no drip |

[1]Uniroyal, Inc. polytetramethylene ether glycol based polyurethane elastoplastic.
[2]Mobay polyester polyurethane elastoplastic in which the prepolymer is made from adipic acid and 1,4-butanediol.
[3]American Cyanamid 100% hexamethoxymethylmelamine.
[4]American Cyanamid hexamethoxymethylmelamine with a methylol content of 1.5%.
[5]The triacetylmelamine was made by reacting melamine with acetic anhydride using sodium acetate as a catalyst following the procedure of J. Casons, J. Amer. Chem. Soc. 69, 49.6 (1947).

It is quite apparent that hexamethoxymethylmelamine prevents the dripping of both types of polyurethane elastoplastics (codes A and B) without decreasing the flammability. By itself, triacetylmelamine decreases the flammability of both types of polyurethane elastoplastics but has no effect on the dripping phenomenon (codes C and D). The combination of triacetylmelamine with Cymel 300 or Cymel 301 increases the flame retardancy of a polyester based polyurethane elastoplastic, producing a self-extinguishing, non-dripping formulation under flaming combustion conditions.

A flame retardant additive system which is unique in its ability to produce polyurethane elastoplastic formulations which are not only self-extinguishing and non-dripping, but also forms a rigid, expanded, foam char, an intumesced structure which is flame resistant and very much like graphite comprises a mixture of (1) an hexaalkoxymethylmelamine, (2) a trihydrocarbylcarbonylmelamine and (3) an aromatic bismaleimide or aromatic bismaleimide generator. Alternately, the trihydrocarbylcarbonylmelamine may be deleted from the formulation and the hexaalkoxymethylmelamine used with an aromatic bismaleimide generator.

Although the actual mechanism is not known, not wishing to be bound by theory, it is surmised that during flaming combustion, some of the unburned polyurethane chains undergo chain scission to form lower molecular weight liquid decomposition products which form an expanding foam with the gases formed from the combustion. Concurrently with the foam formation, the aryl bismaleimide generator or the aryl bismaleimide which forms as a result of the decomposition of the bismaleimide generator, crosslinks the foaming portion of the polymer matrix with the result that the matrix increases to about five to ten times its original volume and is then transformed into the rigid intumesced char. The rigid foamed or intumesced portion insulates the substrate from the destructive effects of any subsequent application of flame thereby preventing it from being transformed into a viscous molten mass. It is most important that the liquification of the polymer matrix, the gas generation and the crosslinking reactions forming foam char occur almost simultaneously, but in the proper sequence.

The following examples give the preparative details of the aryl bismaleimides which are operable in this embodiment of the invention.

EXAMPLE II

Preparation of N,N'-m-phenylene-bis(3,6-methano-1,2,3,6-tetrahydrophthalimide)-MPMT.

Into a one liter, three-neck flask equipped with a reflux condenser, a thermometer, a motor-driven stirrer, a nitrogen bleed and a dropping funnel were placed 50.5g (0.188 mole) of meta-phenylene-bismaleimide and 400 ml of benzene. To the resultant solution, under a blanket of nitrogen, 24 g (0.364 mole) of cyclopentadiene was added over a 30 minute period at which time the temperature rose to 41° C. The reaction mixture was then refluxed for 30 minutes after which the reaction was cooled to room temperature, yielding 74 g of crude N,N'-m-phenylene-bis(3,6-methano-1,2,3,6-tetrahydrophthalimide. The crude product had a melting point of 248°–251° C.

Anal. Calc'd for $C_{24}H_{20}O_4N_2$: C, 71.99; H, 5.03; N, 7.00. Found: C, 72.05; H, 4.87; N, 7.09.

EXAMPLE III

Preparation of N,N'-p-phenylene-bis(3,6-methano-1,2,3,6-tetrahydrophthalimide).-PPMT.

Into a one liter, three-neck flask equipped with a reflux condenser, a motor-driven stirrer, a thermometer, an addition funnel and a nitrogen bleed were placed 400 ml of dry, purified benzene and 50g (0.187 mole) of p-phenylenebismaleimide. Under a nitrogen blanket, the ingredients were heated to 40° C. to dissolve the bismaleimide. The heat source was then removed and 25g (0.374 mole) of cyclopentadiene was added dropwise to the solution over a 30 minute period. The reaction mixture was refluxed for 30 minutes and then cooled to room temperature whereupon the desired product, N,N'-p-phenylene-bis(3,6-methano-1,2,3,6-tetrahydrophthalimide), precipitated from solution. The yield was 74g.

Anal. Calc'd. for $C_{24}H_{20}O_4N_2$: C, 71.99; H, 5.03; N, 7.00. Found: C, 72.89; H, 4.90; N, 7.06.

EXAMPLE IV

Preparation of N,N'-p-phenylene-bis(3,6-oxa-1,2,3,6-tetrahydrophthal imide).-PPOT.

Into a 1 liter, 3-neck flask equipped with a reflux condenser, a motor-driven stirrer, a thermometer and a nitrogen bleed were placed 400 ml of benzene, 80 ml of furan and 50g of p-phenylene-bismaleimide. The mixture was heated under nitrogen to 60° C. for seven hours after which time it was cooled to room temperature and the resultant precipitate, N,N'-p-phenylene-bis(3,6-oxa-1,2,3,6-tetrahydrophthalimide), filtered, washed with ether and dried.

Anal. Calc'd. for $C_{22}H_{16}O_6N_2$: C, 65.34; H, 3.99. Found: C, 65.90; H, 3.94.

EXAMPLE V

This example demonstrates the effectiveness of this embodiment and its subembodiment in flame retarding polyurethane elastoplastics. The preparation and testing of the formulation was carried out following the procedure of Example I and the results are given below in Table II.

TABLE II

| Formulation | I | J | K | L | M | N | O |
|---|---|---|---|---|---|---|---|
| Roylar E85N | 100 | 100 | 100 | 100 | 100 | 100 | 100 |
| Triacetylmelamine | 25 | 25 | 25 | 25 | 25 | — | — |
| Cymel 300 | 10 | 10 | 10 | — | — | 25 | 10 |
| Cymel 301 | — | — | — | 10 | — | — | 10 |
| MPMT[(1)] | 10 | — | — | — | — | 10 | 10 |
| HLP[(2)] | — | 10 | — | — | — | — | — |
| PPMT[(3)] | — | — | 10 | 10 | — | — | — |
| PPOT[(4)] | — | — | — | — | 10 | — | — |
| 0.1 | 33.1 | 28.3 | 30.8 | 30.6 | 27.5 | 32.0 | 30.1 |
| Modified UL-94V(⅛")[(5)] | Intumescent Char: | " | " | " | " | " | " |
| Non-dripping | " | " | " | " | " | " | " |
| Self-extinguishing | " | " | " | " | " | " | " |

[(1)]N,N'-m-phenylene-bis(3,6-methano-1,2,3,6-tetrahydromaleimide); m.pt. = 248-251° C.
[(2)]para-phenylene-maleimide; m.pt. = 360° C.
[(3)]N,N'-p-phenylene-bis(3,6-methano-1,2,3,6-tetrahydromaleimide); m.pt. = 175° C.
[(4)]N,N'-p-phenylene-bis(3,6-oxa-1,2,3,6-tetrahydrophthalimide); m.pt. = ca. 300° C.
[(5)]In this modified test, a formulation was adjudged to pass if the flaming time after each of the successive flame applications did not exceed 50 seconds, the sample could not be reignited by the third application of the flame and the charred portion did not exceed a half inch from the point of ignition.

The above example demonstrates the effectiveness of paraphenylene-bismaleimide and certain arylbismaleimide generators in the presence of a trihydrocarbylcarbonylmelamine and a hexaalkoxymethylmelamine to produce self-extinguishing, non-dripping, intemescent formulations. A critical feature of this embodiment is that the aryl maleimide or aryl maleimide-generating compound must not react with the polyurethane polymer at processing (mixing or molding) temperatures. Metaphenylene-bismaleimide and the adduct of two moles of furan and one mole of meta-phenylene-bismaleimide are not operative in this invention. The former reacts with the polyurethane at processing temperatures, while the latter at the same temperatures decomposes to form furan and meta-phenylenebismaleimide which, in turn, reacts with the polyurethane. Formulations N and O demonstrate that by increasing the relative proportion of the hexaalkoxymethylmelamine, it is possible to eliminate the triacetylmelamine without affecting the intumescent char-forming properties of the polyurethane elastoplastic.

The term "elastoplastic" as used in the specification and claims means non-rigid polyurethanes which can be worked by mechanical means. It includes those polymers which exhibit true elastic behavior as well as those which have only limited elastic recovery upon deformation. These latter polymers can be processed in the same manner as the elastomeric materials at temperatures of about 300°–325° F.

What is claimed is:

1. A flame retarded polyurethane elastoplastic compound which is non-drip at combusion conditions which comprises said elastomer in combination with a minor amount of (A) a hexaalkoxymethylmelamine having the general formula

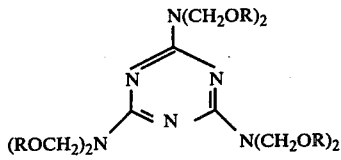

wherein R is a $C_1$–$C_5$ alkyl radical; and (b) a synergist wherein the synergist is (1) a trihydrocarbylcarbonyl-malemine having the general formula

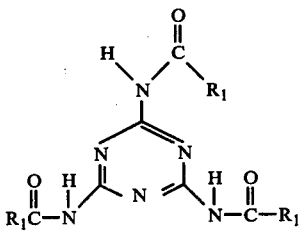

wherein $R_1$ is $C_1$–$C_5$ alkyl, phenyl toluyl, dimethylphenyl or cyanomethyl; (2) para phenylene-bismaleimide; (3) an aromatic bismaleimide generator having the general formula

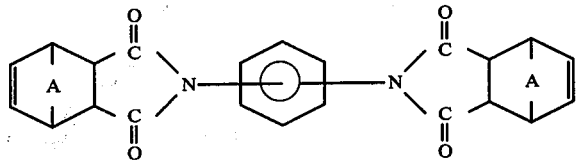

wherein A is —$CH_2$— or —O—; or (4) mixtures thereof.

2. The composition of claim 1 wherein the hexaalkoxymethylmelamine is hexamethoxymethylmelamine, hexaethoxymethylmelamine, hexapropoxymethylmelamine, hexabutoxymethylmelamine, hexaisobutoxymethylmelamine and hexapentoxymethylmelamine.

3. The composition of claim 1 wherein the synergist is triacetylmelamine, tripropionylmelamine, tributanoylmelamine, tripentanoylmelamine, tribenzoylmelamine, tri-(p-methylbenzoyl)melamine, tri-(2,4-dimethylbenzoyl)melamine or tricyanoacetylmelamine.

4. The composition of claim 3 wherein an additional synergist is included wherein the additional synergist is an aromatic bismaleimide.

5. The composition of claim 1 wherein whereas the bismaleimide is N,N'-m-phenylene-bis(3,6-methano-1,2,3,6-tetrahydrophthalimide), N,N'-p-phenylene-bis(3,6-methano-1,2,3,6-tetrahydrophthalimide) or N,N'-p-phenylene-bis(3,6-oxa-1,2,3,6-tetrahydrophthalimide).

6. A method for rendering a polyurethane elastoplastic flame-retarded and non-dripping at combustion conditions which comprises blending the elastoplastic with a minor amount of a hexaalkoxymethylmelamine having the general formula

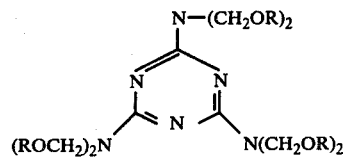

wherein R is a $C_1$–$C_5$ alkyl group and a synergist, wherein the synergist is (1) a trihydrocarbylcarbonylmelamine having the general formula

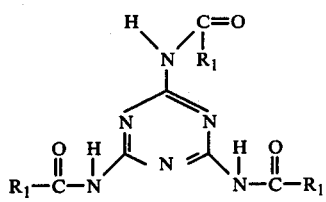

wherein $R_1$ is a $C_1$–$C_5$ alkyl, phenyl, toluyl or —$CH_2$—C≡N, (2) paraphenylene-maleimide, (3) an aromatic bismaleimide generator having the general formula

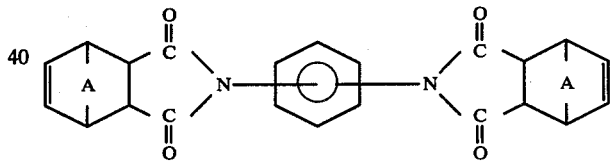

wherein A is —CH— or —O—, provided that when the nitrogen atoms are in the meta configuration, A may not be —O—, or (4) mixtures thereof.

7. The method of claim 6 wherein R is methyl, ethyl, propyl, butyl, isobutyl or pentyl.

8. The method of claim 6 wherein R is methyl, propyl, butyl, pentyl, phenyl, toluyl or —$CH_2$—C≡N.

9. The method of claim 6 wherein the synergist comprises a mixture of a trihydrocarbylcarbonylmelamine and a para phenylenemaleimide.

10. The method of claim 9 wherein the aromatic bismaleimide is p-phenylenebismaleimide.

11. The method of claim 10 wherein the trihydrocarbylcarbonylmelamine is triacetylmelamine, tripropionylmelamine, tributanoylmelamine, tripentanoylmelamine, tribenzoylmelamine, tri(p-methylbenzoyl)melamine, tri-(2,4-dimethylbenzoyl)melamine or tricyanoacetylmelamine.

12. The method of claim 6 wherein the aromatic bismaleimide generator is N,N'-m-phenylene-bis(3,6-methano-1,2,3,6-tetrahydrophthalimide), N,N'-p-phenylenebis(3,6-methano-1,2,3,6-tetrahydrophthalimide) or N,N'-p-phenylene-bis(3,6-oxa-1,2,3,6-tetrahydrophthalimide).

* * * * *